Nov. 10, 1970  D. G. PENSEL  3,538,709
VAPOR DRIVEN ENGINE
Filed Aug. 12, 1968

INVENTOR.
DONALD G. PENSEL

United States Patent Office 3,538,709
Patented Nov. 10, 1970

3,538,709
VAPOR DRIVEN ENGINE
Donald G. Pensel, R.D. 1, Lake George, N.Y. 12845
Filed Aug. 12, 1968, Ser. No. 751,982
Int. Cl. F01k *19/10*
U.S. Cl. 60—96     5 Claims

ABSTRACT OF THE DISCLOSURE

A vapor driven engine such as a turbine provided with auxiliary heat exchange equipment for condensing the engine exhaust and heating the fuel and air to a vapor generator which enables most of the heat, which would normally be wasted, to be conserved and utilized or transferred within the working mechanism of the engine whereby the efficiency of the engine is sharply increased.

SUMMARY OF THE INVENTION

In my invention, the turbine is driven by a vaporized volatile liquid which after use in the engine is cooled condensed and supplied under pressure through a boiler which vaporizes same and thereafter recycles same to the engine. The boiler is supplied with air under pressure and with fuel and exhaust gases are disposed to the atmosphere. A plurality of heat exchangers transfer heat from the liquid leaving the turbine and from the exhaust gases to preheat air and fuel liquid whereby heat losses are reduced to a minimum.

DETAILED DESCRIPTION OF PREFERRED EMBODIMENTS

Figure 1:
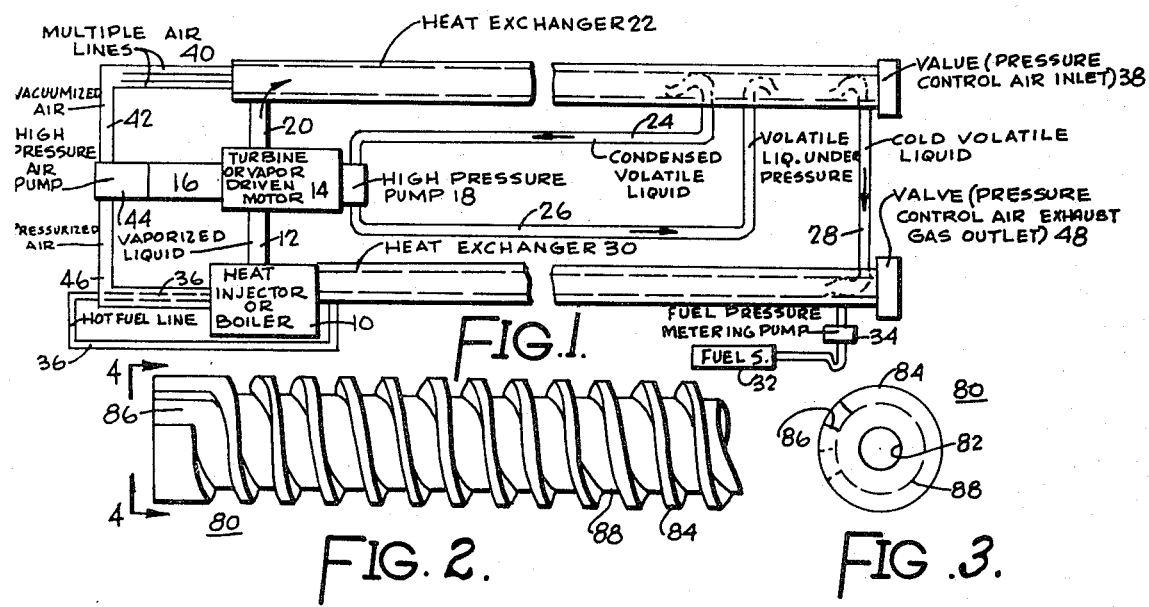
FIG. 1 shows one form of my invention.
Figure 2:
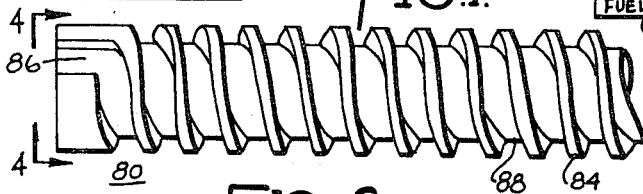
FIG. 2 is a side view of one form of small duct used in my invention.
Figure 3:
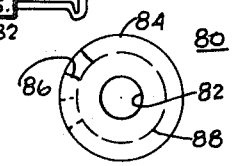
FIG. 3 is an end view of the duct of FIG. 2.
Figure 4:
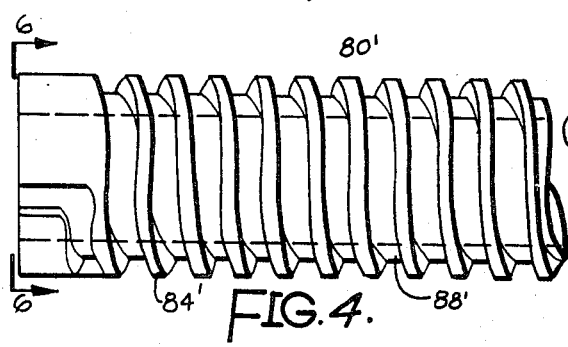
FIG. 4 is a side view of a larger duct similar to FIG. 3.
Figure 5:
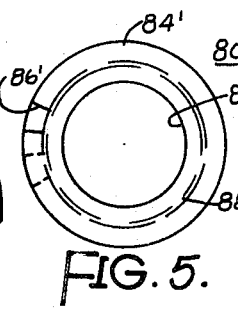
FIG. 5 is an end view of the duct of FIG. 4.

Referring now to FIG. 1, vaporized pressurized liquid leaves boiler 10 and passes through line 12 to turbine 14 to drive same and operate power take off 16. The vaporized liquid leaving the turbine after use passes through line 20 and heat exchanger 22 wherein it is condensed, through line 24 to pump 18 wherein it is pressurized, back through line 26 again into exchanger 22 and out through line 28 and back through heat exchanger 30 to the boiler to complete the cycle.

Fuel from supply 32 travels through metering pump 34 through exchanger 30 and out through line 36 into the boiler.

Air enters through valve 38 and heat exchanger (through multiple lines 40) into line 42, and from there into pump 44. Pressurized air is fed through a conduit 46 surrounding line 36 into the boiler. Waste or exhaust gases from the boiler pass through exchanger 30 and valve 48 to the atmosphere.

Thus, the exhaust gas preheats the fuel and liquid in exchanger 30; and the intake air is preheated by the liquid in exchanger 22 and by the fuel in lines 36 and 46.

Since fuel, liquid, exhaust gas and air flow through various heat exchangers as well as within and between concentric ducts, FIGS. 2–5 show ducts of selected geometry which can be employed.

Duct 80 has a cylindrical surface 88 with inner bore 82, with outer helical fins 84 and a path 86 passing along the outer surface 88 between the fins.

Duct 80' has surface 88' with inner bore 82', fins 84' and path 86'. Since the diameter of bore 82' is the same as the outer diameter of fins 84, duct 80 can fit within duct 80' and duct 80' can fit in turn within a hollow cylinder or sleeve. Each bore and each path then can carry separately, liquid, gas, fuel and air whereby heat exchange can ensue. Indeed the fins can be hollow and/or additional ducts with helical fins can be fitted to provide additional paths. Alternatively only one of ducts 80 and 80' can be disposed within a hollow cylinder.

While I have described my invention with particular reference to the drawings, such is not to be considered as limiting its actual scope.

Having thus described this invention, what is asserted as new is:

1. A system for operating a turbine or other vapor driven motor and minimizing waste heat, said system comprising:
   liquid condenser heat exchanger first means;
   exhaust gas heat exchanger second means;
   a boiler;
   third means to supply fuel through said second means to said boiler;
   fourth means to supply air through said first means to said boiler;
   fifth means to supply exhaust gases from said boiler through said second means to the atmosphere; and
   sixth means to supply a vaporized, pressurized liquid to said motor to operate same and supply the vaporized liquid through said first means to condense and cool the pressurized liquid, through said second means to reheat the liquid, and through said boiler to vaporize and pressurize said liquid for recycling to the motor.

2. A system as set forth in claim 1 wherein said sixth means includes a pump.

3. A system as set forth in claim 2 wherein said third means is provided with a pump.

4. A system as set forth in claim 3 wherein at least one of said heat exchangers utilizes a hollow duct having a cylindrical surface with helical outwardly projecting fins, a path passing along said surface between the fins and an inner cylindrical bore.

5. A system as set forth in claim 4 wherein said duct further includes a second like duct having a bore in which said other duct is disposed.

References Cited

UNITED STATES PATENTS 2,568,787    9/1951    Bosch _____ 60—96 X

CARROLL B. DORITY, Jr., *Primary Examiner*

U.S. Cl. X.R.
165—156